No. 810,420. PATENTED JAN. 23, 1906.
G. W. KIRKPATRICK.
ATTACHMENT FOR VEHICLE WHEELS.
APPLICATION FILED AUG. 8, 1904.

Witnesses.
Walter B. Payne
G. Willard Rich

Inventor.
George W. Kirkpatrick
by Hulenbeck & Church
his Attorney

UNITED STATES PATENT OFFICE.

GEORGE W. KIRKPATRICK, OF ROCHESTER, NEW YORK.

ATTACHMENT FOR VEHICLE-WHEELS.

No. 810,420.     Specification of Letters Patent.     Patented Jan. 23, 1906.

Application filed August 8, 1904. Serial No. 219,351.

*To all whom it may concern:*

Be it known that I, GEORGE W. KIRKPATRICK, of Rochester, in the county of Monroe and State of New York, have invented certain new and useful Improvements in Attachments for Vehicle-Wheels; and I do hereby declare the following to be a full, clear, and exact description of the same, reference being had to the accompanying drawings, forming a part of this specification, and to the reference-numerals marked thereon.

My present invention has for its object to provide an attachment for vehicle-wheels which is particularly adapted to be employed in conjunction with those fitted with pneumatic or other resilient tires such as are employed upon motor-driven vehicles for the purpose of increasing the traction or driving action of the wheels when the vehicle is traveling over road-beds having unstable surfaces and, further, to prevent the wheels from skidding or slipping sidewise when the vehicle is traveling over slippery pavements or when the wheels encounter impediments thereon, such as ruts, street-car tracks, or the like.

To these and other ends the invention consists in certain improvements and combinations of parts, all as will be hereinafter more fully described, the novel features being pointed out in the claims at the end of the specification.

Figure 1:
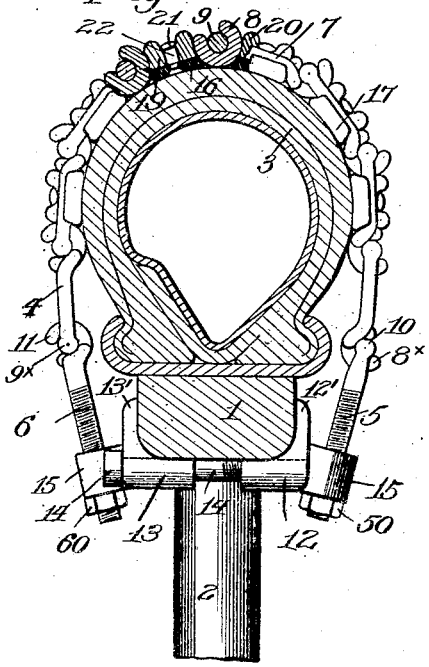
Figure 5:
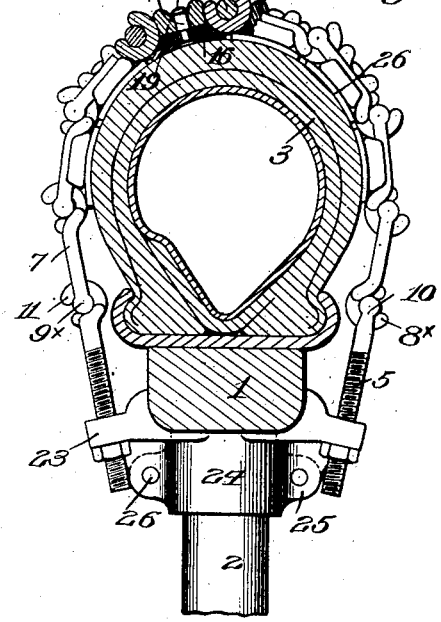
Figure 4:
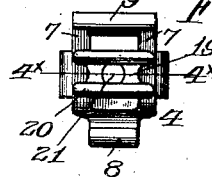
Figure 3:
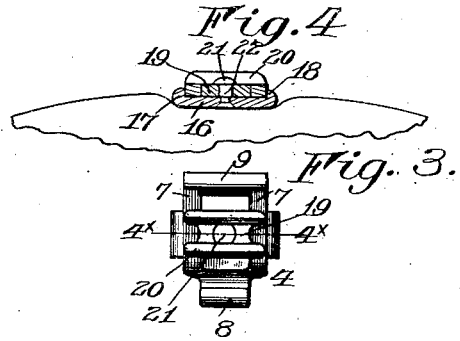
Figure 2:
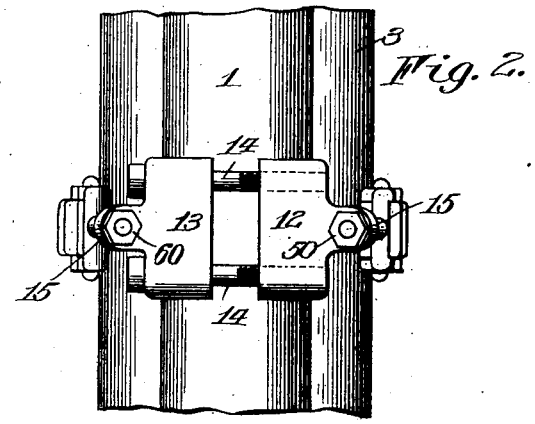

In the drawings, Figure 1 is a transverse sectional view showing a section of a wheel rim or felly and a tire thereon, illustrating the construction and operation of a device embodying my invention. Fig. 2 is a plan view showing a portion of the inside of the rim or felly and illustrating the manner of securing the device thereto. Fig. 3 is a detail plan view of one of the links composing the band or cincture. Fig. 4 is a sectional view thereof, taken on the line $4^\times 4^\times$ of Fig. 3; and Fig. 5 is a view similar to Fig. 1, illustrating a similar device embodying a modification of my invention.

Similar reference-numerals in the several figures indicate similar parts.

An attachment for vehicle-tires constructed in accordance with my invention is adapted particularly to be employed upon vehicle-wheels provided with pneumatic or other forms of rubber tires, and in the present instance I have shown a wheel composed of the rim or felly 1, supported upon spokes 2 and provided with the usual or any preferred form of pneumatic tire 3, to which is applied the attachment embodying my invention. In the present instance this consists of a band or cincture extending over the tread portion and the sides of the tire, which is formed by a plurality of flat chain-links 4, the end ones thereof engaging securing members in the form of bolts 5 and 6, which are adjustable upon a saddle arranged within the rim of the wheel, so that the band may be drawn or tightened to any desired degree upon the tire. In the illustration the chain-links 4 are of that particular type known as "driving" or "conveyer" chains, having the open rectangular body portion composed of the parallel side bars 7 and the forward and rear cross-bars or ends 8 and 9, respectively, the former of which comprises a hook adapted to removably interlock with the cylindrical rear end of the adjacent link. The band, composed of a plurality of these chain-links, will be provided at one end with a hook $8^\times$, which engages in an eye 10, formed upon the securing member 5, while its opposite end is provided with an aperture into which the hook 11 on the member 6 projects to engage the rear end bar $9^\times$, as shown in Figs. 1 and 2.

In order to form a bearing or support for the securing members, I provide a saddle, located within the circumference of the rim or felly 1 and preferably adapted to rest upon the inner surface thereof, which is composed of sections 12 and 13, having lips 12' 13', adapted to extend over the sides of the rim 1 and to engage therewith when said sections are adjusted relatively to each other by means of screws 14. The sections are each provided with perforated ears or lugs 15, through which the members or bolts 5 and 6 pass and which are arranged at slight angles to their respective saddle-sections, so as to pitch the attaching ends of the bolts or members outwardly, as shown, so that the end of the band or cincture will be drawn down tightly when the bolts are set up by the nuts 50 and 60, which may be in the form of thumb-nuts. It is not essential that both of the members 5 and 6 be made adjustable, as one of them might be stationary; but I prefer to make them both adjustable, as this arrangement facilitates tightening the band to prevent it from slipping transversely of the tire, as would be the case if but one of the members is adjustable. By making both of the latter removable they may be disconnected from the saddle when it is desired to remove the band from the tire, permitting the saddle to be left in position on the wheel, enabling the coöperating parts to be quickly applied whenever their use is desired.

The band or cincture may be formed simply by a plurality of the chain-links before described; but as the curved hooked ends 8 form projections which are out of alinement with their side bars 7 their extensive use is liable to injure the surface of the tire when they unavoidably engage stones or other hard projections which may be encountered upon a road-bed. To avoid this difficulty, I provide on the inner sides of each of the links bearing-plates 16, having the ends extending beyond the outer edges of the links, which are curved or rounded, as shown at 17, and provided with the edges 18, which embrace the side bars 7 of the links. These bearing-plates are concaved transversely and are formed of such a depth that when the band is applied in operative position its inner surface will practically form a continuous curved face over the tread portion of the tire, as shown in Fig. 1. The bearing-plates having the rounded ends and extending beyond the edge of the links will prevent the latter from abrading the tire if during the rotation of the wheels the attachment engages an obstruction which would tend either to shift the position of the band or to lift one of its edges away from the tire, as might occur in certain instances if the latter becomes slightly deflated or the band should become loosened. In addition to the bearing-plates I also provide some of the links with wear-plates having bases 19 fitting between the side bars 7 of the links and provided with ribs 20, the ends of which extend over them, as shown particularly in Figs. 3 and 4. The means for attaching these plates to their respective links consists of a rivet 21, having a shoulder 22, which engages the inner side of the bearing-plate 16 and provided at its ends with heads, as shown, which are upset to firmly secure the parts in place, the provision of the shoulder 22 being for the purpose of preventing the rivet from being driven through the bearing-plate into engagement with the tire in case its outer head should become worn away or otherwise removed. The ribs 20 on the wear-plates extend transversely of the band, so that they not only form good gripping devices, but will also clear themselves of mud and other plastic material which is more or less adhesive.

In Fig. 5 I have illustrated the invention embodying a modified form of a saddle, in which the latter consists of the single piece 23, resting against the rim or felly 1 and provided with an inwardly-extending curved shoulder 24, adapted to embrace one side of a spoke of the wheel. This shoulder is provided with ears 25, adapted to receive screws 26, passing through a similarly-formed clamping-plate (not shown) embracing the opposite side of the spoke to removably secure the saddle thereto, as will be understood. If desired, the band or cincture may be provided with a lining composed of pieces of rubber or similar material (indicated by 26) arranged beneath each of the bearing-plates 16, as shown in Fig. 5.

The attachment for vehicle-wheels such as I have described is simple in construction and consists of few parts. By making the saddle of relatively adjustable parts it may be readily applied to rims or fellies of various widths, and the band or cincture being composed of links or jointed sections makes it flexible, allowing it to accommodate itself to all the movements of a tire, and, further, these sections being detachable and interchangeable the length of the band may be readily increased or decreased to accommodate tires of greater or less diameter, and, if necessary, worn-out sections may be removed and new ones substituted.

I claim as my invention—

1. An attachment for vehicle-wheels embodying a member forming a saddle adapted to be located within the wheel-rim, means for securing the saddle thereto and a band extending over the tread portion of the wheel, means for detachably connecting one end of the band to the saddle and a securing member engaging the opposite end of the band and adjustable on the saddle to tighten the band.

2. An attachment for vehicle-wheels embodying a member forming a saddle adapted to rest upon the inner surface of the wheel-rim, and means for securing the saddle thereon, a flexible band extending over the tread portion of the wheel and members detachably engaging the ends of the band and adjustable on the saddle to tighten the band.

3. An attachment for vehicle-wheels embodying a member forming a saddle adapted to be located within the wheel-rim, having laterally-extending ears and means for securing the saddle to the rim, a band extending over the tread portion of the wheel, a fastening member attached to one of the ears on the saddle and connected to one end of the band, a bolt extending through the other ear and detachably connected to the other end of the band and a nut on the bolt for adjusting it.

4. An attachment for vehicle-wheels embodying a member forming a saddle adapted to be located within the wheel-rim, a band composed of chain-links extending over the tread portion of the wheel and attached at one end to the saddle, a bolt adjustable through the latter and provided with a hook adapted to detachably engage the free end of the band.

5. The combination with a vehicle-wheel having a rim or felly and a tire thereon, a saddle adapted to rest upon the rim and comprising sections adjustable relatively into engagement with the sides of the rim or felly, of a band extending over the tire and means adjustable on the saddle for tightening the band.

6. The combination with a vehicle-wheel having a rim or felly and a tire thereon, a saddle adapted to rest upon the rim and comprising sections adapted to rest upon the inner surface of the rim and extend over the sides thereof, means for adjusting the sections relatively, of a band extending over the tire and means adjustable on the saddle for tightening the band.

7. The combination with a vehicle-wheel having a rim or felly and a tire thereon, a saddle adapted to rest upon the rim and comprising sections adapted to rest upon the inner surface of the rim and extend over the sides thereof, and perforated ears extending outwardly on the sections, of means for adjusting the sections relatively, a band extending over the tire, securing devices connected to the ends of the band and extending through the ears and means for adjusting the devices to tighten the band.

8. An attachment for vehicle-wheels comprising a band adapted to engage over a tire composed of a plurality of pivoted links, bearing-plates arranged between the latter and the tire, wear-plates on the outer faces of the links, means for attaching said plates to the links and means for securing the band to the tire.

9. An attachment for vehicle-wheels comprising a band adapted to extend over a tire composed of a plurality of flat open links, bearing-plates arranged between the latter and the tire having upturned or rounded ends at the edges of the links, wear-plates on the outer faces of the links and fastening devices securing said plates to the separate links and means for securing the band to the tire.

10. An attachment for vehicle-wheels comprising a band adapted to extend over a tire composed of a plurality of pivoted links, bearing-plates arranged between the latter and the tire, wear-plates on the outer faces of the links, a rivet passing through the wear-plate having a shoulder engaging the bearing-plate and provided with heads securing both of said plates to the separate links and means for securing the band to the tire.

11. An attachment for vehicle-wheels comprising a band adapted to extend over a tire composed of a plurality of flat open links, bearing-plates arranged between the latter and the tire having upturned or rounded ends embracing the edges of the links, wear-plates on the outer faces of the links having ribs extending transversely thereof and means for connecting the band to the tire.

12. An attachment for vehicle-wheels comprising a band adapted to extend over a tire composed of a plurality of flat open links, bearing-plates arranged between the latter and the tire having their inner faces concaved to fit the surface of the tire, wear-plates on the outer faces of the links provided with projections extending between the sides of the links, devices securing said plates to their respective links and means for securing the band to the tire.

13. An attachment for vehicle-wheels embodying a band or cincture composed of a plurality of jointed sections extending transversely of the tire of the wheel, a lining composed of a plurality of sections, one of said sections being attached to the inner side of each of the sections of the band and means for securing the latter to the tire.

GEORGE W. KIRKPATRICK.

Witnesses:
L. WILLARD RICH,
F. N. HOWARD.